United States Patent
Aldossary et al.

(10) Patent No.: US 11,629,294 B2
(45) Date of Patent: Apr. 18, 2023

(54) CONTROLLING A TURBOCHARGER SYSTEM

(71) Applicant: Saudi Arabian Oil Company, Dhahran (SA)

(72) Inventors: Raed M. Aldossary, Al Jubail (SA); Abdullah Alwarthan, Dammam (SA); Hassan AlAmoodi, Al Jubail (SA)

(73) Assignee: Saudi Arabian Oil Company, Dhahran (SA)

(*) Notice: Subject to any disclaimer, the term of this patent is extended or adjusted under 35 U.S.C. 154(b) by 57 days.

(21) Appl. No.: 17/190,184

(22) Filed: Mar. 2, 2021

(65) Prior Publication Data

US 2022/0282663 A1 Sep. 8, 2022

(51) Int. Cl.
| | | |
|---|---|---|
| F02B 37/013 | (2006.01) | |
| F02B 37/18 | (2006.01) | |
| C10G 7/12 | (2006.01) | |
| B01D 53/14 | (2006.01) | |
| B01D 53/18 | (2006.01) | |

(52) U.S. Cl.
CPC ........... *C10G 7/12* (2013.01); *B01D 53/1412* (2013.01); *B01D 53/18* (2013.01); *B01D 2252/204* (2013.01); *F05D 2260/606* (2013.01); *F05D 2260/83* (2013.01); *F05D 2270/3013* (2013.01)

(58) Field of Classification Search
CPC ................ B01D 53/1412; B01D 53/18; B01D 2252/204; C10G 7/12; F05D 2260/83; F05D 2270/3013; F05D 2260/606
See application file for complete search history.

(56) References Cited

U.S. PATENT DOCUMENTS

| | | |
|---|---|---|
| 8,447,500 B2 | 5/2013 | Suzuki et al. |
| 9,932,918 B2 | 4/2018 | Haskara et al. |
| 2015/0118131 A1* | 4/2015 | Martin ............... B01D 53/1456 422/187 |
| 2016/0312140 A1* | 10/2016 | Krish ...................... C10L 3/103 |
| 2016/0363043 A1 | 12/2016 | Hirayama |
| 2016/0376913 A1* | 12/2016 | Marocchini ........... F01D 17/105 137/511 |

* cited by examiner

*Primary Examiner* — Timothy C Vanoy
(74) *Attorney, Agent, or Firm* — Fish & Richardson P.C.

(57) ABSTRACT

A turbocharger control system includes a turbine; a fluid source of a pressurized fluid; an input valve fluidly coupled between the fluid source and an input of the turbine; a bypass valve fluidly coupled between the fluid source and an output of the turbine; a rotating machine operatively coupled to the turbine and configured to move a working fluid; and a control system communicably coupled to the input valve and the bypass valve. The control system is configured to perform operations including determining a level of the pressurized fluid in the fluid source; determining at least one of a flow rate or a pressure of a working fluid moved by the rotating machine; and operating the input valve and the bypass valve to change an operating state of the turbine from a first operating state to a second operating state.

41 Claims, 4 Drawing Sheets

| Op. Mode | 105 | 109 | 107 |
|---|---|---|---|
| Initialization | Manual | None | None |
| Stabilization | Manual | Automatic | None |
| Damping | Manual | Manual | Automatic |
| Underloaded | Manual | Automatic | Automatic (SP+1%) |
| Overloaded | Manual | Automatic | Automatic (SP-1%) |
| Shutdown | Automatic | Manual | Manual |

CONTROLLING A TURBOCHARGER SYSTEM

TECHNICAL FIELD

The present disclosure describes methods and systems for controlling a turbocharger system.

BACKGROUND

Rotating machines, such as pumps, fans, compressors, or generators can be driven by a turbine. The turbine drives the rotating machine through a moving fluid (such as a gas) that forcibly turns the blades of the turbine. As the fluid expands (for example, from a higher pressure to a lower pressure), the potential energy of the fluid is converted to kinetic energy of the rotating blades of the turbine, which are connected to an axle or shaft of the turbine. The shaft of the turbine is connected to the rotating machine in order to transfer the kinetic energy of the turbine to the rotating machine.

SUMMARY

In an example implementation, a turbocharger control system includes a turbine; a fluid source fluidly coupled to the turbine, the fluid source including a pressurized fluid; at least one input valve fluidly coupled between the fluid source and an input of the turbine; at least one bypass valve fluidly coupled between the fluid source and an output of the turbine; a rotating machine operatively coupled to the turbine and configured to move a working fluid; and a control system communicably coupled to the at least one input valve and the at least one bypass valve. The control system is configured to perform operations including determining a level of the pressurized fluid in the fluid source; determining at least one of a flow rate or a pressure of a working fluid moved by the rotating machine; and based on at least one of the determined fluid source level and the at least one of the determined flow rate or pressure, operating the at least one input valve and the at least one bypass valve to change an operating state of the turbine from a first operating state to a second operating state.

In an aspect combinable with the example implementation, the pressurized fluid includes rich amine, the working fluid includes lean amine, and the fluid source includes an amine contactor column.

In another aspect combinable with any of the previous aspects, the rotating machine includes at least one pump that includes an output fluidly coupled to the fluid source through a propane chiller.

In another aspect combinable with any of the previous aspects, the first operating state includes an initialization state and the second operating state includes a stabilization state.

In another aspect combinable with any of the previous aspects, the operation of operating the at least one input valve and the at least one bypass valve to change an operating state of the turbine from the first operating state to the second operating state includes determining that the at least one input valve is in an automatic mode; determining that an output recycle valve of the rotating machine is closed; and switching the turbine from the initialization state to the stabilization state.

In another aspect combinable with any of the previous aspects, the control system is configured to perform operations further including operating the at least one input valve and the at least one bypass valve to change the operating state of the turbine from the second operating state to a third operating state.

In another aspect combinable with any of the previous aspects, the second operating state includes the stabilization state and the third operating state includes a damping state.

In another aspect combinable with any of the previous aspects, the operation of operating the at least one input valve and the at least one bypass valve to change an operating state of the turbine from the second operating state to the third operating state includes determining that an output flow valve of the rotating machine is open within a specified open percentage range; determining a flow of the working fluid is within a specified flow rate range; determining a level of the fluid source is at least greater than a threshold set point; and switching the turbine from the stabilization state to the damping state.

In another aspect combinable with any of the previous aspects, the control system is configured to perform operations, during the damping state, including determining an overload on the turbine; operating the at least one input valve to adjust toward a closed position to reduce a flow rate of the pressurized fluid through the at least one input valve; and operating the at least one bypass valve to adjust toward an open position to increase a flow rate of the pressurized fluid through the at least one bypass valve.

In another aspect combinable with any of the previous aspects, the operation of determining the overload on the turbine includes determining that a discharge pressure of the working fluid from the rotating machine is above a threshold pressure.

In another aspect combinable with any of the previous aspects, the control system is configured to perform operations, during the damping state, including determining that the discharge pressure of the working fluid from the rotating machine is below the threshold pressure; and switching the turbine from the damping state to the stabilization state.

In another aspect combinable with any of the previous aspects, the control system is configured to perform operations, during the damping state, including determining an underload on the turbine; operating the at least one input valve to adjust toward an open position to increase a flow rate of the pressurized fluid through the at least one input valve; and operating the at least one bypass valve to adjust toward a closed position to decrease a flow rate of the pressurized fluid through the at least one bypass valve.

In another aspect combinable with any of the previous aspects, the operation of determining the underload on the turbine includes determining that an output valve fluidly coupled to an output of the rotating machine is open more than a threshold open percentage.

In another aspect combinable with any of the previous aspects, the control system is configured to perform operations, during the damping state, including determining that the output valve fluidly coupled to the output of the rotating machine is open less than the threshold open percentage; and switching the turbine from the damping state to the stabilization state.

Another aspect combinable with any of the previous aspects further includes a safety shutdown valve that includes an input fluidly coupled to an outlet of the fluid source; and an output fluidly coupled to the at least one input valve.

In another aspect combinable with any of the previous aspects, the control system is configured to perform operations, during the damping state, including determining that the safety shutdown valve is in a closed position; and based on the determination that the safety shutdown valve is in the closed position, switching the turbine from the damping state to a shutdown state.

In another aspect combinable with any of the previous aspects, the at least one input valve includes a primary input valve fluidly coupled between the fluid source and a primary input of the turbine; and a secondary input valve fluidly coupled between the fluid source and a secondary input of the turbine.

In another aspect combinable with any of the previous aspects, the control system is configured to perform operations including at least one of based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

In another example implementation, a method of controlling a turbocharger system that includes a turbine, a fluid source including a pressurized fluid that is fluidly coupled to the turbine, at least one input valve fluidly coupled between the fluid source and an input of the turbine, at least one bypass valve fluidly coupled between the fluid source and an output of the turbine, and a rotating machine, includes determining a level of the pressurized fluid in the fluid source; determining at least one of a flow rate or a pressure of a working fluid moved by the rotating machine; and based on at least one of the determined fluid source level and the at least one of the determined flow rate or pressure, operating the at least one input valve and the at least one bypass valve to change an operating state of the turbine from a first operating state to a second operating state.

In an aspect combinable with the example implementation, the pressurized fluid includes rich amine, the working fluid includes lean amine, the fluid source includes an amine contactor column, and the rotating machine includes at least one pump that includes an output fluidly coupled to the fluid source through a propane chiller.

In another aspect combinable with any of the previous aspects, the first operating state includes an initialization state and the second operating state includes a stabilization state.

In another aspect combinable with any of the previous aspects, operating the at least one input valve and the at least one bypass valve to change an operating state of the turbine from the first operating state to the second operating state includes determining that the at least one input valve is in an automatic mode; determining that an output recycle valve of the rotating machine is closed; and switching the turbine from the initialization state to the stabilization state.

Another aspect combinable with any of the previous aspects further includes operating the at least one input valve and the at least one bypass valve to change the operating state of the turbine from the second operating state to a third operating state.

In another aspect combinable with any of the previous aspects, the second operating state includes the stabilization state and the third operating state includes a damping state.

In another aspect combinable with any of the previous aspects, operating the at least one input valve and the at least one bypass valve to change an operating state of the turbine from the second operating state to the third operating state includes determining that an output flow valve of the rotating machine is open within a specified open percentage range; determining a flow of the working fluid is within a specified flow rate range; determining a level of the fluid source is at least greater than a threshold set point; and switching the turbine from the stabilization state to the damping state.

Another aspect combinable with any of the previous aspects further includes, during the damping state, determining an overload on the turbine; operating the at least one input valve to adjust toward a closed position to reduce a flow rate of the pressurized fluid through the at least one input valve; and operating the at least one bypass valve to adjust toward an open position to increase a flow rate of the pressurized fluid through the at least one bypass valve.

In another aspect combinable with any of the previous aspects, determining the overload on the turbine includes determining that a discharge pressure of the working fluid from the rotating machine is above a threshold pressure.

Another aspect combinable with any of the previous aspects further includes, during the damping state, determining that the discharge pressure of the working fluid from the rotating machine is below the threshold pressure; and switching the turbine from the damping state to the stabilization state.

Another aspect combinable with any of the previous aspects further includes, during the damping state, determining an underload on the turbine; operating the at least one input valve to adjust toward an open position to increase a flow rate of the pressurized fluid through the at least one input valve; and operating the at least one bypass valve to adjust toward a closed position to decrease a flow rate of the pressurized fluid through the at least one bypass valve.

In another aspect combinable with any of the previous aspects, determining the underload on the turbine includes determining that an output valve fluidly coupled to an output of the rotating machine is open more than a threshold open percentage.

Another aspect combinable with any of the previous aspects further includes, during the damping state, determining that the output valve fluidly coupled to the output of the rotating machine is open less than the threshold open percentage; and switching the turbine from the damping state to the stabilization state.

In another aspect combinable with any of the previous aspects, the turbocharger system further includes a safety shutdown valve that includes an input fluidly coupled to an outlet of the fluid source, and an output fluidly coupled to the at least one input valve.

Another aspect combinable with any of the previous aspects further includes, during the damping state, determining that the safety shutdown valve is in a closed position; and based on the determination that the safety shutdown valve is in the closed position, switching the turbine from the damping state to a shutdown state.

In another aspect combinable with any of the previous aspects, the at least one input valve includes a primary input valve fluidly coupled between the fluid source and a primary input of the turbine, and a secondary input valve fluidly coupled between the fluid source and a secondary input of the turbine.

Another aspect combinable with any of the previous aspects further includes at least one of based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

In another example implementation, a computer-implemented method of controlling a turbocharger system includes identifying, with a computing system that includes one or more hardware processors, one or more operating conditions of a turbocharger system that includes a turbine, a fluid source including a pressurized fluid that is fluidly coupled to the turbine, at least one input valve fluidly coupled between the fluid source and an input of the turbine, at least one bypass valve fluidly coupled between the fluid source and an output of the turbine, and a rotating machine; determining, with the computing system, a level of the pressurized fluid in the fluid source based on at least one of the one or more identified operating conditions; determining, with the computing system, at least one of a flow rate or a pressure of a working fluid moved by the rotating machine based on at least another one of the one or more identified operating conditions; and based on at least one of the determined fluid source level and the at least one of the determined flow rate or pressure, operating, with the computing system, the at least one input valve and the at least one bypass valve to change an operating state of the turbine from a first operating state to a second operating state.

In an aspect combinable with the example implementation, the first operating state includes an initialization state and the second operating state includes a stabilization state.

In another aspect combinable with any of the previous aspects, operating the at least one input valve and the at least one bypass valve to change an operating state of the turbine from the first operating state to the second operating state includes determining, with the computing system, that the at least one input valve is in an automatic mode; determining, with the computing system, that an output recycle valve of the rotating machine is closed; and switching, with the computing system, the turbine from the initialization state to the stabilization state.

Another aspect combinable with any of the previous aspects further includes operating, with the computing system, the at least one input valve and the at least one bypass valve to change the operating state of the turbine from the second operating state to a third operating state.

In another aspect combinable with any of the previous aspects, the second operating state includes the stabilization state and the third operating state includes a damping state.

In another aspect combinable with any of the previous aspects, operating the at least one input valve and the at least one bypass valve to change an operating state of the turbine from the second operating state to the third operating state includes determining, with the computing system, that an output flow valve of the rotating machine is open within a specified open percentage range; determining, with the computing system, a flow of the working fluid is within a specified flow rate range; determining, with the computing system, a level of the fluid source is at least greater than a threshold set point; and switching, with the computing system, the turbine from the stabilization state to the damping state.

Another aspect combinable with any of the previous aspects further includes, during the damping state, determining, with the computing system, an overload on the turbine; operating, with the computing system, the at least one input valve to adjust toward a closed position to reduce a flow rate of the pressurized fluid through the at least one input valve; and operating, with the computing system, the at least one bypass valve to adjust toward an open position to increase a flow rate of the pressurized fluid through the at least one bypass valve.

In another aspect combinable with any of the previous aspects, determining the overload on the turbine includes determining, with the computing system, that a discharge pressure of the working fluid from the rotating machine is above a threshold pressure.

Another aspect combinable with any of the previous aspects further includes, during the damping state, determining, with the computing system, that the discharge pressure of the working fluid from the rotating machine is below the threshold pressure; and switching, with the computing system, the turbine from the damping state to the stabilization state.

Another aspect combinable with any of the previous aspects further includes, during the damping state, determining, with the computing system, an underload on the turbine; operating, with the computing system, the at least one input valve to adjust toward an open position to increase a flow rate of the pressurized fluid through the at least one input valve; and operating, with the computing system, the at least one bypass valve to adjust toward a closed position to decrease a flow rate of the pressurized fluid through the at least one bypass valve.

In another aspect combinable with any of the previous aspects, determining the underload on the turbine includes determining, with the computing system, that an output valve fluidly coupled to an output of the rotating machine is open more than a threshold open percentage.

Another aspect combinable with any of the previous aspects further includes, during the damping state, determining, with the computing system, that the output valve fluidly coupled to the output of the rotating machine is open less than the threshold open percentage; and switching, with the computing system, the turbine from the damping state to the stabilization state.

In another aspect combinable with any of the previous aspects, the turbocharger system further includes a safety shutdown valve that includes an input fluidly coupled to an outlet of the fluid source, and an output fluidly coupled to the at least one input valve.

Another aspect combinable with any of the previous aspects further includes, during the damping state, determining, with the computing system, that the safety shutdown valve is in a closed position; and based on the determination that the safety shutdown valve is in the closed position, switching, with the computing system, the turbine from the damping state to a shutdown state.

In another aspect combinable with any of the previous aspects, the at least one input valve includes a primary input valve fluidly coupled between the fluid source and a primary input of the turbine, and a secondary input valve fluidly coupled between the fluid source and a secondary input of the turbine.

Another aspect combinable with any of the previous aspects further includes at least one of: based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

Implementations of a turbocharger control system according to the present disclosure may include one or more of the following features. For example, a turbocharger control system according to the present disclosure can provide for more reliable turbocharger operation as compared to conventional turbocharger controllers. As another example, a turbocharger control system according to the present disclosure can, in the context of a gas treatment plant, help reduce a potential gas treatment unit trip. Further, a turbocharger control system according to the present disclosure can help reduce a frequency of altering a speed of the turbocharger. In another example, a turbocharger control system according to the present disclosure can provide for more efficient level control at an upstream column in a gas plant. As another example, a turbocharger control system according to the present disclosure can provide for a stable discharge pressure to avoid potentially tripping a turbocharger. Further, a turbocharger control system according to the present disclosure as applied to a gas plant can provide for a stable flow of lean amine.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
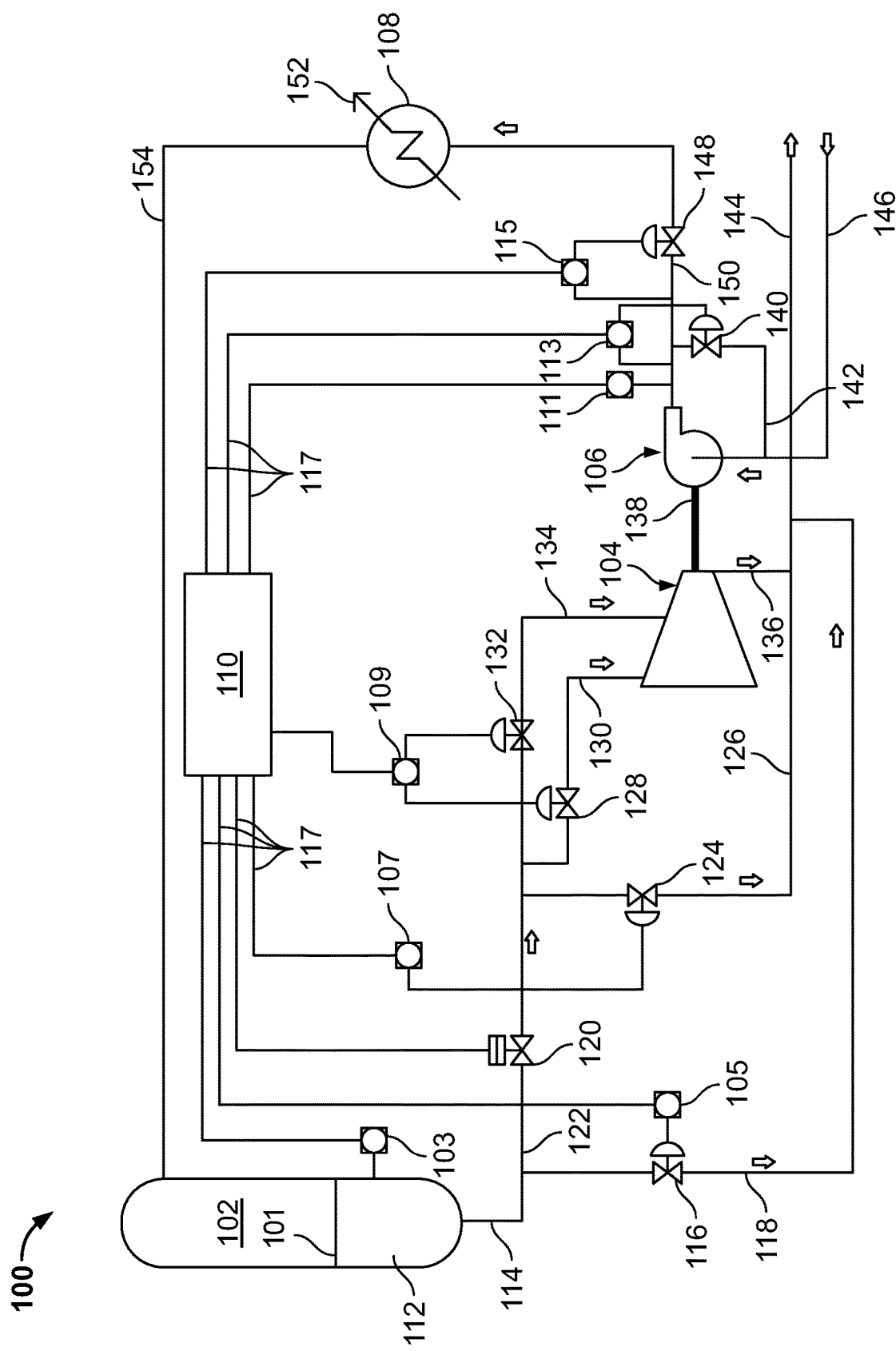
FIG. 1 is a schematic diagram of an example implementation of a turbocharger control system for a gas plant system according to the present disclosure.

FIG. 1 is a schematic diagram of an example implementation of a turbocharger control system for a gas plant system 100 according to the present disclosure. As shown in FIG. 1, a portion of the gas plant system 100 is illustrated, generally, as having a turbine 104 that is operatively coupled (for example, through a shaft 138) with a rotating machine 106. In this example, the rotating machine 106 comprises a pump 106 (such as a centrifugal pump or other type of pump). Together, the turbine 104 and pump 106 (and one or more other components of the system 100) for a turbocharger system that operates, for example, to circulate a working fluid through the portion of the gas plant system 100 shown in FIG. 1.

In this example, as described in more detail herein, the turbocharger system operates to circulate a flow of a lean amine liquid through the gas plant system 100 by the pump 106. However, other example implementations of the turbocharger control system may operate to flow other fluids (liquids or gasses or mixed phase fluids) in other systems, whether related to a hydrocarbon processing facility or not. Further, the rotating machine driven by the turbine 104, while a liquid pump 106 in this example, can be any type of rotating machine, such as a compressor, fan, generator, or other machine that utilizes rotational power to move (or otherwise act on) a working fluid. The turbine 104, regardless of the type of rotating machine 106, utilizes a fluid, such as a high pressure gas, to drive the turbine 104 through a transfer of potential energy in the gas to kinetic energy of the turbine 104 (through a reduction of pressure of the high pressure gas to a lower pressure state).

In the specific example of FIG. 1, an amine contactor column 102 provides a source of a fluid that can drive the turbine 104; in this example, a rich amine fluid 112. An outlet 114 of the amine contactor column 102, which facilitates a flow of the rich amine fluid 112 from the amine contactor column 102, is fluidly coupled to a primary conduit 122 and a bypass conduit 118. In the present disclosure, a "conduit" can be a tubular system, piping, or other form of flow path through which a fluid can be circulated, either through a pressure differential, forced pumping, or a combination of both.

The primary conduit 122 is fluidly coupled through a safety shutoff valve 120 to a secondary bypass conduit 126 as well as a primary turbine input 134 and a secondary turbine input 130. A turbocharger bypass valve 116 is fluidly coupled within the bypass conduit 118, which terminates to fluidly connect with the secondary bypass conduit 126 as shown. Both of the primary turbine input 134 and a secondary turbine input 130 are connected to the turbine 104 to facilitate a flow of the rich amine fluid 112 to the turbine 104 to operatively drive the turbine 104. As shown in this example, a bypass valve 124 is fluidly coupled in the secondary bypass conduit 126, which provides a rich amine flow 144 out of the portion of the gas plant system 100 as shown. A turbine output fluid 136 (for example, the rich amine fluid 112 at a lower pressure state having transferred the potential energy to the turbine 104) joins the secondary bypass conduit 126 as the rich amine flow 144 out of the portion of the gas plant system 100 as shown.

Each input conduit to the turbine 104 includes an input valve. For example, as shown in this example, a primary input valve 132 is fluidly coupled in the primary turbine input 134 to control an amount of primary rich amine fluid that is provided to the turbine 104 to drive the turbine 104. A secondary input valve 128 is fluidly coupled in the secondary turbine input 130 to control an amount of secondary rich amine fluid that is provided to the turbine 104 to drive the turbine 104. As explained in more detail herein, the primary input valve 132 and secondary input valve 128 can be operated individually or in combination to supply the rich amine fluid 112 through one or both of the valves (depending on the operating state of the turbocharger system) to the turbine 104.

The pump 106 includes a pump input that is fluidly coupled to a lean amine flow 146 that enters the portion of the gas plant system 100 shown in FIG. 1. A pump output 150 is fluidly coupled through a lean amine valve 148 to a heat exchanger 108. In this example, the lean amine flow 146 is also directly coupled to the pump output 150 through a recycle valve 140 (and through bypass conduit 142).

In this example, the heat exchanger 108 comprises a chiller, such as a propane chiller 108. The propane chiller 108 operates to cool a temperature of the lean amine fluid 146 circulated there through with a flow of propane gas 152

(that is at a lower temperature than the lean amine fluid 146). A cooled lean amine fluid 154 is circulated back to the amine contactor column 102. In some aspects, the amine contactor column 102, acts as an absorption column. Lean amine solution flows from a top to a bottom of the amine absorption column 102. A sour gas (not shown) flows from the bottom of the column 102 to the top. In some aspects, sour gasses (for example, $H_2S$ and $CO_2$) are absorbed in the amine solution and sweet hydrocarbon gases are taken out from the column overhead. Rich amine fluid 112 is taken out from the bottom of the absorption column to drive the turbine 104.

The example implementation shown in FIG. 1 also includes a turbocharger control system comprised of a system controller 110 and multiple component controllers (103, 105, 107, 109, 111, 113, and 115). In this example, the turbocharger control system is shown as physically divided between the system controller 110 and the multiple component controllers (103, 105, 107, 109, 111, 113, and 115). However, in some aspects, the turbocharger control system may be implemented in a single control unit that integrates the system controller 110 and the multiple component controllers (103, 105, 107, 109, 111, 113, and 115). Thus, the present disclosure contemplates that the turbocharger control system can be a single hardware component that combines the system controller 110 and the multiple component controllers (103, 105, 107, 109, 111, 113, and 115), as well as multiple hardware units as shown.

Generally, the turbocharger control system (in other words, the system controller 110 and the multiple component controllers) operates to modulate one or more of the illustrated valves in the system 100 to optimally operate the turbine 104 and the pump 106 based on one or more operating conditions in the system 100. In some aspects, the operating conditions, such as pressure (absolute or differential), flow rate, temperature, pump speed, turbine speed, fluid level, or other conditions) may be measured or sensed by sensors (not shown) within the system 100 that are communicably coupled to the system controller 110 (directly or indirectly, such as through a component controller). Thus, in some aspects, reference to a particular component controller can also include reference to a sensor associated with the component controller (or a controller that is simply a sensor). The sensors and component controllers can be communicably coupled (wired or wirelessly) to the system controller 110 through communication connections 117, which represent any appropriate form (for example, physical form or communication protocol, or both) of communication between the controllers.

In this example implementation, the component controllers/sensors include a level indicator (sensor) 103 that measures or senses a level 101 of the rich amine fluid 112 in the amine contactor column 102. The component controllers/sensors also include a valve controller 105 for the turbocharger bypass valve 116. The component controllers/sensors also include a valve controller 107 for the bypass valve 124. The component controllers/sensors also include a valve controller 109 for the primary input valve 132 and the secondary input valve 128. The component controllers/sensors also include a pressure indicator (sensor) 111 for the lean amine fluid 146 output from the pump 106. The component controllers/sensors also include a valve/flow controller 113 for the recycle valve 140. The component controllers/sensors also include a valve/flow controller 115 for the lean amine valve 148. In some aspects, a valve/flow controller may include both a flow sensor (that measures or senses flow of a fluid) as well as a valve actuator controller.

As shown in FIG. 1, the safety shutdown valve 120 is directly coupled to the system controller 110. Thus in this example, the system controller 110 can determine (for example, based on a signal from an actuator of the safety shutdown valve 120) whether the safety shutdown valve 120 is closed (for example, 100% closed) or open (for example, 100% open).

In this example implementation of the gas plant system 100, the turbocharger control system can operate to optimally operate the turbine 104 and the pump 106 through multiple operational states, as well as maintain a desired level of the rich amine fluid 112 in the amine contactor column 102, depending on the operating conditions in the system 100. For example, the turbocharger control system can transition operation of the turbine 104 and the pump 106 through multiple operational states, including: an initialization state, a stabilization state, a damping state, and shutdown state. One or more of these states can also include sub-states that the turbocharger control system can manage. For example, the damping state can include an overloaded sub-state and an underloaded sub-state, which refer to an amount of load (being over or under a desired amount) on the turbine 104.

Each of these example operational states can represent different operational states of the components of the system 100 (in other words, valves, the turbine 104, the pump 106, and other components) as well as a different operational state of the turbocharger control system. For example, in the initialization state, the system controller 110 can be in an idle mode while the component controllers (for example, the valve controllers) can be in a manual operation mode (for example, to be manually manipulated by a human operator). In some aspects, regardless of the operational state at which the turbocharger control system is operating, deactivation of the turbocharger control system and closure of the safety shutdown valve 120 will result in a change of operational state back to the initialization state.

In some aspects, the turbocharger control system can switch the operational state to the stabilization state based on one or more operating conditions and activation of the turbocharger control system. For example, in some aspects, once certain permissive conditions (for example, the valve controller 109 being in an auto operation mode, the valve/flow controller 113 being closed, and related components being in a healthy condition), the turbocharger control system can be switched to the stabilization state. In the stabilization state, the turbocharger control system operates the components of the turbocharger system to stabilize a level 101 of the rich amine fluid 112 at a particular threshold level in the amine contactor column 102. In some aspects, the level 101 of the rich amine fluid 112 can be manipulated and controlled based on, for example, controlled operation of the primary input valve 132 by the valve controller 109. In some aspects, regardless of the operational state at which the turbocharger control system is operating, detection of a failure of any related component (for example, valve, sensor, or otherwise) can result in the turbocharger control system switching to the stabilization state in order to, for instance, enhance the reliability of turbocharger control system.

In some aspects, the turbocharger control system can switch the operational state to the damping state based on one or more operating conditions and activation of the turbocharger control system. For example, if the level 101 of the rich amine fluid 112 is above or equal to a desired level and the lean amine valve 148 is within a controllable range (for example, between 30%-65% open), the turbocharger system acceleration is damped and the turbocharger control system can maintain the level 101 of the rich amine fluid 112 through manipulation of a set point of the bypass valve 124 by the valve controller 107. In some aspects, the damping state facilitates the controllability of a discharge flow of lean amine fluid 150 from the pump 106. In some aspects, the turbocharger system operates in the damping state for normal operation (and for most of the operation time) unless a process disturbance occurs.

As described, the damping state can include an overloaded sub-state and an underloaded sub-state. In the underloaded sub-state, for example, the turbocharger load is determined to be underloaded. This determination can be made by the turbocharger control system, for example, by determining that the lean amine valve 148 is opened beyond a controllable opening percentage (for example, beyond 65% open). The turbocharger control system can remedy the underloaded sub-state, for example, by controlling the bypass valve 124 through the valve controller 107 to close, thereby diverting a flow of the bypassed rich amine fluid 112 to the primary input valve 132 (which may be further opened by the valve controller 109). Once the opening range of the lean amine valve 148 is detected to be within the controllable range, the turbocharger control system can switch the operational state from the underloaded sub-state to the stabilization state.

In the overloaded sub-state, for example, the turbocharger load is determined to be overloaded. This determination can be made by the turbocharger control system, for example, by determining that a pressure value detected by the pressure indicator 111 is above a certain threshold pressure (for example, above 1100 psig). The turbocharger control system can reduce the load on the turbocharger system, for example, by controlling the primary input valve 132 through the valve controller 109 to close, thereby diverting a flow of the rich amine fluid 112 through the primary turbine input 134 to the bypass valve 124 (which may be further opened by the valve controller 107). Once the pressure value detected by the pressure indicator 111 is below the certain threshold pressure (for example, below 1100 psig), the turbocharger control system can switch the operational state from the overloaded state to the stabilization state.

In some aspects, the turbocharger control system can switch the operational state to the shutdown state based on one or more operating conditions. For example, when the system controller 110 detects that the safety shutdown valve 120 is closed, the turbocharger control system can enter the shutdown state and maintain a level 101 of the rich amine fluid 112 at the amine contactor column 102 through manipulating an opening percentage of the turbocharger bypass valve 116 through the valve controller 105.

Figures 2, 3:
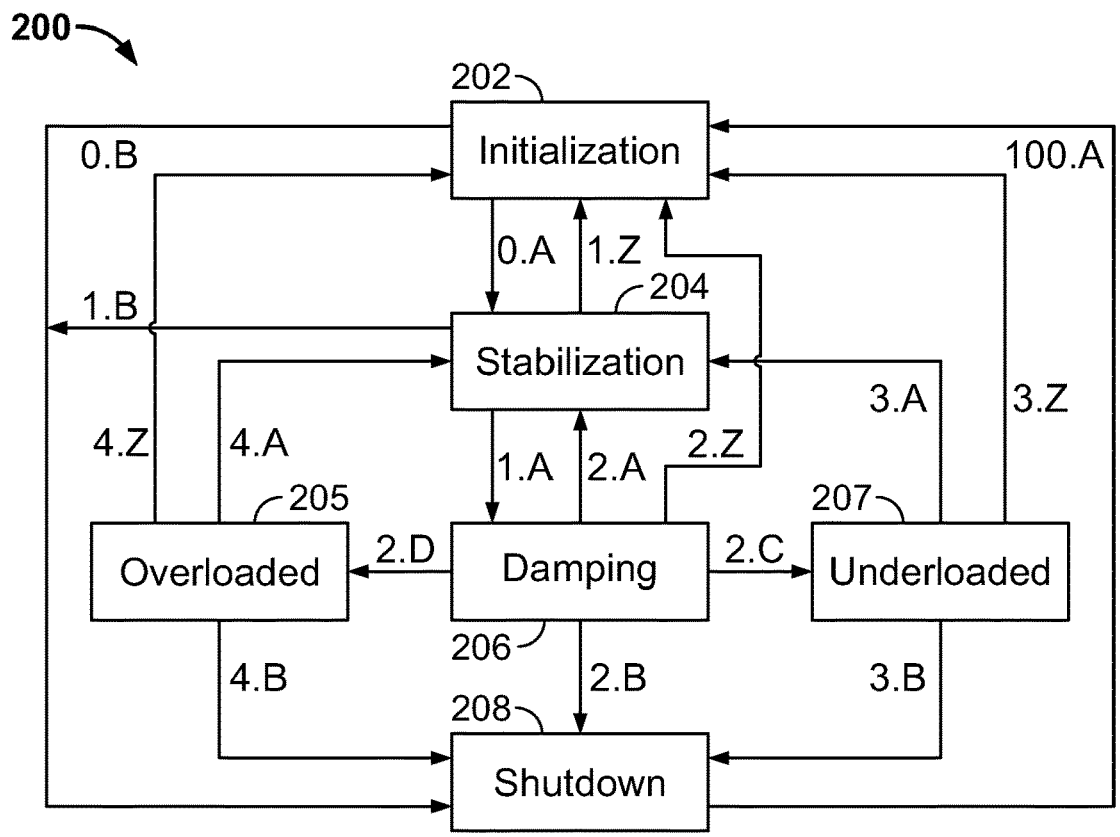
FIG. 2 is an example state transition diagram of the turbocharger control system according to the present disclosure.
FIG. 3 is a table that describes component actions during each state of the turbocharger control system according to the present disclosure.

FIG. 2 is an example state transition diagram 200 of the turbocharger control system according to the present disclosure. For example, state transition diagram 200 shows all of the possible transitions between each operational state (for example, initialization state 202, stabilization state 204, damping state 206, shutdown state 208) and every other operational state of the turbocharger control system. The connecting lines and notations in state transition diagram 200 illustrate how the turbocharger control system transitions from each state to every other state.

For example, initialization state 202 can transition to shutdown state 208 through path 0.B and to stabilization state 204 through path 0.A. In path 0.A, initialization state 202 transitions to stabilization state 204 when, for example, all related instruments are healthy, the recycle valve 140 is closed and/or the valve controller 109 is operating in automatic mode (for example, the controller 109 is operating based on a provided set point), and the turbocharger control system is activated.

In path 0.B, initialization state 202 transitions to shutdown state 208 when the safety shutdown valve 120 is detected (for example, by system controller 110) as closed.

The stabilization state 204 can transition to the initialization state 202 through path 1.Z, to the shutdown state 208 through path 1.B, and to the damping state 206 through the path 1.A. For example, in path 1.A, the stabilization state 204 transitions to damping state 206 when, for example, the lean amine valve 148 is open within a controllable range (for example, 30-65% open), a flow rate of the lean amine fluid (or pump output) 150 (for example, as determined by valve/flow controller 115) is within an acceptable range (for example, 200 GPM), or a level 101 of the rich amine fluid 112 (as detected by level sensor 103) is equal to or greater than the threshold level set point (or a combination of such operating conditions)

In path 1.B, the stabilization state 204 transitions to shutdown state 208 when the safety shutdown valve 120 is detected (for example, by system controller 110) as closed.

In path 1.Z, the stabilization state 204 transitions to the initialization state 202 when, for example, the turbocharger control system is deactivated (for example, through a control switch or button by a human operator).

The damping state 206 can transition to the stabilization state 204 through path 2.A, to the shutdown state 208 through path 2.B, to the initialization state 202 through the path 2.Z, to the overloaded sub-state 205 through path 2.D, and to the underloaded sub-state 207 through path 2.C. For example, in path 2.A, the damping state 206 transitions to the stabilization state 204 when, for example, a level 101 of the rich amine fluid 112 is less than a set point by a particular amount (for example, less than 0.5%) and the bypass valve 124 is open less than a particular amount (for example, less than 2%). As another example, in path 2.A, the damping state 204 transitions to the stabilization state 204 when a level 101 of the rich amine fluid 112 is greater than the set point by the particular amount (for example, more than 0.5%) and the bypass valve 124 is open more than a particular amount (for example, more than 95%). As another example, in path 2.A, the damping state 204 transitions to the stabilization state 204 when the bypass valve 124 is in manual state for a particular time duration (for example, 60 seconds) within entering the damping state 206. As another example, in path 2.A, the damping state 204 transitions to the stabilization state 204 when there is an instrument failure.

In path 2.B, the damping state 206 transitions to shutdown state 208 when the safety shutdown valve 120 is detected (for example, by system controller 110) as closed.

In path 2.C, the damping state 206 transitions to the underloaded sub-state 207 when, for example, the lean amine valve 148 is open greater than a particular percentage (for example, greater than 70%) for at least a particular time duration (for example, 60 seconds) within entering the damping state 206. As another example, the damping state 206 transitions to the underloaded sub-state 207 when, for example, the lean amine valve 148 is in automatic control mode (for example, when the valve/flow controller 115 is operating the valve 148 based on a programmed set point).

In path 2.D, the damping state 206 transitions to the overloaded sub-state 205 when, for example, a pressure value of the lean amine fluid 150 from the pump 106 is greater than or equal to a particular threshold pressure (for example, 1150 psig).

In path 2.Z, the damping state 206 transitions to the initialization state 202 when, for example, the turbocharger control system is deactivated (for example, through a control switch or button by a human operator).

The underloaded sub-state 207 can transition to the stabilization state 204 through path 3.A, to the shutdown state 208 through path 3.B, and to the initialization state 202 through the path 3.Z. For example, in path 3.A, the underloaded sub-state 207 transitions to the stabilization state 204 when, for example, the lean amine valve 148 is open within a controllable range (for example, less than 65% open) and/or the valve controller 109 is operating in an automatic mode (for example, controlling the primary and secondary input valves to a particular set point). As another example, in path 3.A, the underloaded sub-state 207 transitions to the stabilization state 204 when there is an instrument failure.

In path 3.B, the underloaded sub-state 207 transitions to shutdown state 208 when the safety shutdown valve 120 is detected (for example, by system controller 110) as closed.

In path 3.Z, the underloaded sub-state 207 transitions to the initialization state 202 when, for example, the turbocharger control system is deactivated (for example, through a control switch or button by a human operator).

The overloaded sub-state 205 can transition to the stabilization state 204 through path 4.A, to the shutdown state 208 through path 4.B, and to the initialization state 202 through the path 4.Z. For example, in path 4.A, the overloaded sub-state 205 transitions to the stabilization state 204 when, for example, when a pressure of the lean amine fluid 150 (as detected by the pressure indicator 111) is less than or equal to a set point pressure (for example, 1100 psig). As another example, in path 4.A, the overloaded sub-state 205 transitions to the stabilization state 204 when there is an instrument failure.

In path 4.B, the overloaded sub-state 205 transitions to shutdown state 208 when the safety shutdown valve 120 is detected (for example, by system controller 110) as closed.

In path 4.Z, the overloaded sub-state 205 transitions to the initialization state 202 when, for example, the turbocharger control system is deactivated (for example, through a control switch or button by a human operator).

FIG. 3 is a table 300 that describes component actions during each state of the turbocharger control system according to the present disclosure. For example, as shown, table 300 describes an operational mode of the valve controller 105, the valve controller 109, and the valve controller 107 (for the turbocharger bypass valve 116, the primary and secondary input valves 132 and 128, and the bypass valve 124, respectively) for each operational state and sub-state initialization, stabilization, damping, underloaded, overloaded, and shutdown). In this table, "manual" can mean that the particular valve controller is being operated, for example, by the system controller 110 or a human operator, to keep its valve at a specified valve position (for example, percent open) regardless of other operation conditions of the system 100. "Automatic" can mean that the particular valve controller is operating to keep its valve at a specified valve position (for example, percent open) based on a provided set point in response to other operation conditions of the system 100. In some aspects, the valve controller can operate automatically based on a range about a set point (for example, "SP (set point)+1%). "None" can mean that the particular valve controller is not operating to keep its valve at a valve position.

Figure 4:
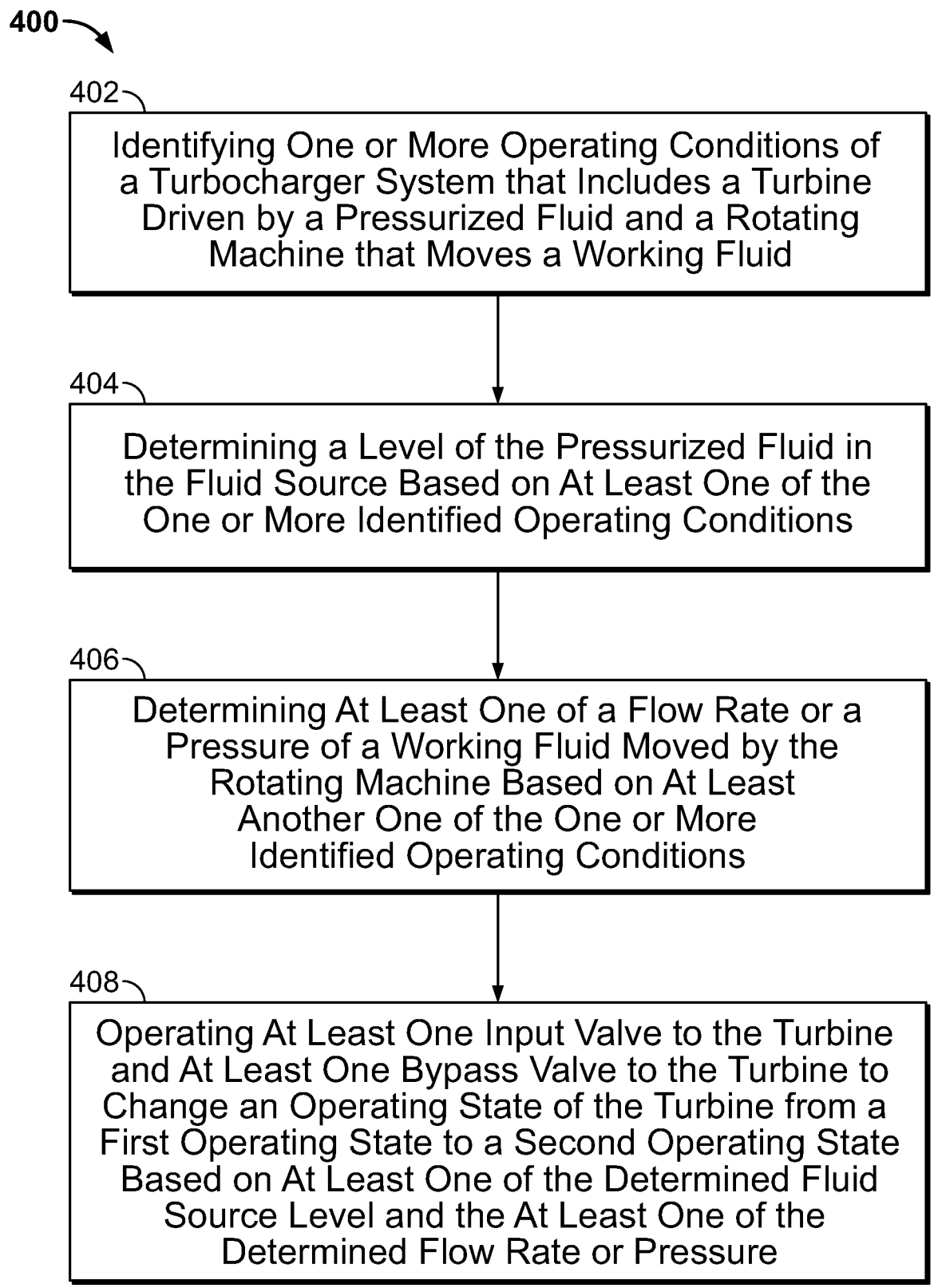
FIG. 4 is a flowchart of an example method performed with or by a turbocharger control system according to the present disclosure.

FIG. 4 is a flowchart of an example method performed with or by a turbocharger control system according to the present disclosure. For example, in some aspects, the method 400 can be performed with or by the turbocharger control system of FIG. 1, including the system controller 110 and the component controllers (for example, controllers 105, 107, 109, 113, and 115), as well as sensors 103 and 111. In some aspects, all or a portion of the method 400 is performed with a computing system through the execution of software instructions by one or more hardware processors (for example, as part of the turbocharger control system). In some aspects, at least a portion of the method is performed by one or more components (for example, the turbine 104, the pump 106, and one or more valves of the system 100 under the control, direct or indirect, of the turbocharger control system). Method 400 may begin at step 402, which includes identifying one or more operating conditions of a turbocharger system that includes a turbine driven by a pressurized fluid and a rotating machine that moves a working fluid. For example, a turbocharger system can include, as shown in FIG. 1, a turbine operatively coupled to a rotating machine, such as a pump. The turbine can be driven (for example, rotated) by a pressurized fluid that is stored, such as, for example, a rich amine fluid in a gas plant system that is stored (at least transiently) in an amine column contactor (as the fluid source). Operating conditions of the turbocharger system can be measured or sensed by one or more sensors, such as a level indicator that measures a fluid level of the pressurized fluid in the fluid source, opening percentages of one or more valves in the turbocharger system (such as one or more valves on an input side of the turbine and one or more valves on an output side of the rotating machine), as well as one or more operating pressures of the turbocharger system.

Method 400 can continue at step 404, which includes determining a level of the pressurized fluid in the fluid source based on at least one of the one or more identified operating conditions. For example, one of the operating conditions can be a fluid level of the rich amine fluid in the amine contactor column. For example, with reference to FIG. 1, the level indicator 103 can measure the fluid level of the rich amine fluid in the amine contactor column.

Method 400 can continue at step 406, which includes determining at least one of a flow rate or a pressure of a working fluid moved by the rotating machine based on at least another one of the one or more identified operating conditions. For example, the pressure of the working fluid, such as a lean amine fluid moved by the pump, can be detected or measured, with reference to FIG. 1, by the pressure indicator 111. A flow rate of the working fluid moved by the pump, with reference to FIG. 1, can be measured or sensed by the valve/flow controller 115. For example, in some aspects, the valve/flow controller 115 can directly measure the flow rate of the lean amine fluid circulated from an output of the pump. In some aspects, a flow rate can be sensed or measured indirectly (for example, determined that a flow rate has been established) by determining an open percentage of the lean amine valve 148 (by the valve/flow controller 115) in FIG. 1.

Method 400 can continue at step 408, which includes operating at least one input valve to the turbine and at least one bypass valve to the turbine to change an operating state of the turbine from a first operating state to a second operating state based on at least one of the determined fluid source level and the at least one of the determined flow rate or pressure. For example, as described with reference to FIGS. 2-3, the turbocharger system can be operating in one of several states depending on the determined fluid source level and the at least one of the determined flow rate or pressure.

For example, the first operating state can be an initialization state and the second operating state can be a stabilization state. As described with reference to FIG. 2, the turbocharger control system can transition the turbocharger system from the initialization state to the stabilization state based at least in part on the determined flow rate of the working fluid; in this example, the recycle valve 140 being in a closed position. By switching from the initialization state to the stabilization state, the turbocharger control system can operate the primary valve input 132 to control an amount of rich amine fluid 112 to the turbine 104, thereby also controlling a level of the rich amine fluid 112 in the amine contactor column 102.

In another example of step 408, the first operating state can be the stabilization state state and the second operating state can be a damping state. As described with reference to FIG. 2, the turbocharger control system can transition the turbocharger system from the stabilization state to the damping state based at least in part on the determined flow rate of the working fluid; in this example, the lean amine valve 148 being within a controllable range, as well as the level of the rich amine fluid 112 being above a particular threshold. By switching from the stabilization state to the damping state, the turbocharger control system can operate the bypass valve 124 to control an amount of rich amine fluid 112 to the turbine 104, thereby also controlling a level of the rich amine fluid 112 in the amine contactor column 102 and the discharge flow of the lean amine fluid 150 from the pump 106.

In another example of step 408, the first operating state can be the damping state and the second operating state can be an underloaded state. As described with reference to FIG. 2, the turbocharger control system can transition the turbocharger system from the damping state to the underloaded state based at least in part on the determined flow rate of the working fluid; in this example, the lean amine valve 148 being greater than a particular threshold percentage open for a particular time period of entering the damping state (in other words, an uncontrollable range of the valve 148). By switching from the damping state to the underloaded state, the turbocharger control system can operate the bypass valve 124 and the primary input valve 132 to divert more rich amine fluid 112 to the turbine 104 to increase the load on the turbine 104.

In another example of step 408, the first operating state can be the damping state and the second operating state can be an overloaded state. As described with reference to FIG. 2, the turbocharger control system can transition the turbocharger system from the damping state to the overloaded state based at least in part on the determined pressure of the working fluid; in this example, the pressure of the lean amine fluid 150 being greater than a particular threshold pressure (as determined by the pressure indicator 111). By switching from the damping state to the overloaded state, the turbocharger control system can operate the bypass valve 124 and the primary input valve 132 to divert more rich amine fluid 112 away from the turbine 104 (and through the bypass valve 124) to decrease the load on the turbine 104.

The example steps of method 400 can be iteratively repeated during operation of the turbocharger system to provide for optimum turbocharger efficiency. For example, steps 402-408 can be repeated during operation of the turbocharger system to switch from one operational state to another operational state based on the identified operating conditions. Besides the examples of the transition from first operational state to second operational state as described previously, other transitions are possible as described with reference to FIGS. 2-3. For example, the turbocharger control system can switch from the damping state to the stabilization state or the initialization state. The turbocharger control system can switch from the overloading state to the damping state, the stabilization state, or the initialization state. The turbocharger control system can switch from the underloaded state to the damping state, the stabilization state, or the initialization state. The turbocharger control system can switch from any of the initialization state, the stabilization state, the damping state, the overloading state, or the underloaded state to the shutdown state (and from the shutdown state to any of the other states) based on, for example, a state (open or closed) of the safety shutdown valve. Accordingly, example method 400 also can include such transitions as well.

Figure 5:
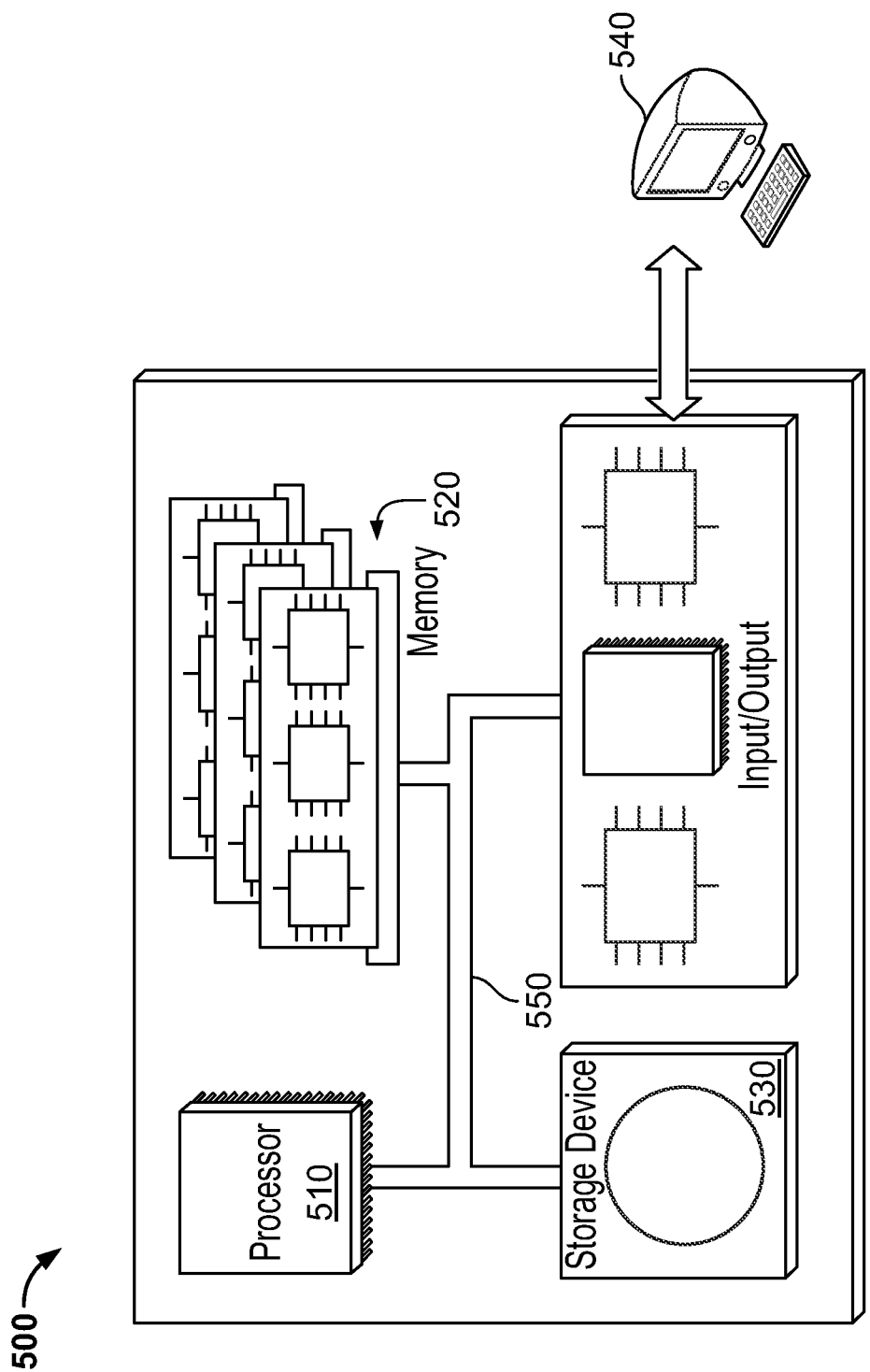
FIG. 5 is a schematic illustration of an example controller (or control system) for a turbocharger control system according to the present disclosure.

FIG. 5 is a schematic illustration of an example controller 500 (or control system) for operating a downhole flow control system, such as all or a portion of the system controller 110 of FIG. 1. For example, all or parts of the controller 500 can be used for the operations described previously, for example as or as part of the turbocharger control system. The controller 500 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A turbocharger control system, comprising:
   a turbine;
   a fluid source fluidly coupled to the turbine, the fluid source comprising a pressurized fluid;
   at least one input valve fluidly coupled between the fluid source and an input of the turbine;
   at least one bypass valve fluidly coupled between the fluid source and an output of the turbine;
   a rotating machine operatively coupled to the turbine and configured to move a working fluid; and
   a control system communicably coupled to the at least one input valve and the at least one bypass valve, the control system configured to perform operations comprising:
      determining a level of the pressurized fluid in the fluid source;
      determining at least one of a flow rate or a pressure of a working fluid moved by the rotating machine; and
      based on at least one of the determined fluid source level and the at least one of the determined flow rate or pressure, operating the at least one input valve and the at least one bypass valve to change an operating state of the turbine from a first operating state to a second operating state, wherein the first operating state comprises an initialization state and the second operating state comprises a stabilization state, and the operation of operating the at least one input valve and the at least one bypass valve to change an operating state of the turbine from the first operating state to the second operating state comprises:

determining that the at least one input valve is in an automatic mode;

determining that an output recycle valve of the rotating machine is closed; and switching the turbine from the initialization state to the stabilization state, and wherein the control system is configured to perform operations further comprising:

operating the at least one input valve and the at least one bypass valve to change the operating state of the turbine from the second operating state to a third operating state.

2. The turbocharger control system of claim 1, wherein the pressurized fluid comprises rich amine, the working fluid comprises lean amine, and the fluid source comprises an amine contactor column.

3. The turbocharger control system of claim 2, wherein the rotating machine comprises at least one pump that comprises an output fluidly coupled to the fluid source through a propane chiller.

4. The turbocharger control system of claim 1, wherein the second operating state comprises the stabilization state and the third operating state comprises a damping state, and the operation of operating the at least one input valve and the at least one bypass valve to change the operating state of the turbine from the second operating state to the third operating state comprises:

determining that an output flow valve of the rotating machine is open within a specified open percentage range;

determining a flow of the working fluid is within a specified flow rate range;

determining a level of the fluid source is at least greater than a threshold set point; and switching the turbine from the stabilization state to the damping state.

5. The turbocharger control system of claim 4, wherein the control system is configured to perform operations, during the damping state, comprising:

determining an overload on the turbine;

operating the at least one input valve to adjust toward a closed position to reduce a flow rate of the pressurized fluid through the at least one input valve; and operating the at least one bypass valve to adjust toward an open position to increase a flow rate of the pressurized fluid through the at least one bypass valve.

6. The turbocharger control system of claim 5, wherein the operation of determining the overload on the turbine comprises determining that a discharge pressure of the working fluid from the rotating machine is above a threshold pressure.

7. The turbocharger control system of claim 6, wherein the control system is configured to perform operations, during the damping state, comprising:

determining that the discharge pressure of the working fluid from the rotating machine is below the threshold pressure; and switching the turbine from the damping state to the stabilization state.

8. The turbocharger control system of claim 4, wherein the control system is configured to perform operations, during the damping state, comprising:

determining an underload on the turbine;

operating the at least one input valve to adjust toward an open position to increase a flow rate of the pressurized fluid through the at least one input valve; and operating the at least one bypass valve to adjust toward a closed position to decrease a flow rate of the pressurized fluid through the at least one bypass valve.

9. The turbocharger control system of claim 8, wherein the operation of determining the underload on the turbine comprises determining that an output valve fluidly coupled to an output of the rotating machine is open more than a threshold open percentage.

10. The turbocharger control system of claim 9, wherein the control system is configured to perform operations, during the damping state, comprising:

determining that the output valve fluidly coupled to the output of the rotating machine is open less than the threshold open percentage; and switching the turbine from the damping state to the stabilization state.

11. The turbocharger control system of claim 4, further comprising a safety shutdown valve that comprises:

an input fluidly coupled to an outlet of the fluid source; and an output fluidly coupled to the at least one input valve.

12. The turbocharger control system of claim 11, wherein the control system is configured to perform operations, during the damping state, comprising:

determining that the safety shutdown valve is in a closed position; and based on the determination that the safety shutdown valve is in the closed position, switching the turbine from the damping state to a shutdown state.

13. The turbocharger control system of claim 1, wherein the at least one input valve comprises:

a primary input valve fluidly coupled between the fluid source and a primary input of the turbine; and a secondary input valve fluidly coupled between the fluid source and a secondary input of the turbine.

14. The turbocharger control system of claim 13, wherein the control system is configured to perform operations comprising at least one of:

based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

15. The turbocharger control system of claim 13, wherein the pressurized fluid comprises rich amine, the working fluid comprises lean amine, and the fluid source comprises an amine contactor column.

16. The turbocharger control system of claim 15, wherein the rotating machine comprises at least one pump that comprises an output fluidly coupled to the fluid source through a propane chiller.

17. A method of controlling a turbocharger system that comprises a turbine, a fluid source comprising a pressurized fluid that is fluidly coupled to the turbine, at least one input valve fluidly coupled between the fluid source and an input of the turbine, at least one bypass valve fluidly coupled between the fluid source and an output of the turbine, and a rotating machine, the method comprising:

determining a level of the pressurized fluid in the fluid source;
determining at least one of a flow rate or a pressure of a working fluid moved by the rotating machine; and
based on at least one of the determined fluid source level and the at least one of the determined flow rate or pressure, operating the at least one input valve and the at least one bypass valve to change an operating state of the turbine from a first operating state to a second operating state,
wherein the first operating state comprises an initialization state and the second operating state comprises a stabilization state, and operating the at least one input valve and the at least one bypass valve to change an operating state of the turbine from the first operating state to the second operating state comprises:
determining that the at least one input valve is in an automatic mode,
determining that an output recycle valve of the rotating machine is closed, and
switching the turbine from the initialization state to the stabilization state, and
wherein the method further comprises operating the at least one input valve and the at least one bypass valve to change the operating state of the turbine from the second operating state to a third operating state.

18. The method of claim 17, wherein the pressurized fluid comprises rich amine, the working fluid comprises lean amine, the fluid source comprises an amine contactor column, and the rotating machine comprises at least one pump that comprises an output fluidly coupled to the fluid source through a propane chiller.

19. The method of claim 17, wherein the second operating state comprises the stabilization state and the third operating state comprises a damping state, and operating the at least one input valve and the at least one bypass valve to change an operating state of the turbine from the second operating state to the third operating state comprises:
determining that an output flow valve of the rotating machine is open within a specified open percentage range;
determining a flow of the working fluid is within a specified flow rate range;
determining a level of the fluid source is at least greater than a threshold set point; and
switching the turbine from the stabilization state to the damping state.

20. The method of claim 19, further comprising, during the damping state:
determining an overload on the turbine;
operating the at least one input valve to adjust toward a closed position to reduce a flow rate of the pressurized fluid through the at least one input valve; and
operating the at least one bypass valve to adjust toward an open position to increase a flow rate of the pressurized fluid through the at least one bypass valve.

21. The method of claim 20, wherein determining the overload on the turbine comprises determining that a discharge pressure of the working fluid from the rotating machine is above a threshold pressure.

22. The method of claim 21, further comprising, during the damping state:
determining that the discharge pressure of the working fluid from the rotating machine is below the threshold pressure; and
switching the turbine from the damping state to the stabilization state.

23. The method of claim 19, further comprising, during the damping state:
determining an underload on the turbine;
operating the at least one input valve to adjust toward an open position to increase a flow rate of the pressurized fluid through the at least one input valve; and
operating the at least one bypass valve to adjust toward a closed position to decrease a flow rate of the pressurized fluid through the at least one bypass valve.

24. The method of claim 23, wherein determining the underload on the turbine comprises determining that an output valve fluidly coupled to an output of the rotating machine is open more than a threshold open percentage.

25. The method of claim 24, further comprising, during the damping state:
determining that the output valve fluidly coupled to the output of the rotating machine is open less than the threshold open percentage; and
switching the turbine from the damping state to the stabilization state.

26. The method of claim 19, wherein the turbocharger system further comprises a safety shutdown valve that comprises an input fluidly coupled to an outlet of the fluid source, and an output fluidly coupled to the at least one input valve, the method further comprising, during the damping state:
determining that the safety shutdown valve is in a closed position; and
based on the determination that the safety shutdown valve is in the closed position, switching the turbine from the damping state to a shutdown state.

27. The method of claim 19, wherein the pressurized fluid comprises rich amine, the working fluid comprises lean amine, the fluid source comprises an amine contactor column, and the rotating machine comprises at least one pump that comprises an output fluidly coupled to the fluid source through a propane chiller.

28. The method of claim 19, wherein the at least one input valve comprises a primary input valve fluidly coupled between the fluid source and a primary input of the turbine, and a secondary input valve fluidly coupled between the fluid source and a secondary input of the turbine, the method further comprising at least one of:
based on the determined fluid source level being at or less than a particular level threshold, operating the primary input valve to open to a fully open position and the secondary input valve to a fully closed position based on an output of the control system up to 66% output; or
based on the determined fluid source level being greater than the particular level threshold, operating the primary input valve to open to the fully open position and the secondary input valve to a fully open position based on the output of the control system between 66%-100% output.

29. The method of claim 17, wherein the at least one input valve comprises a primary input valve fluidly coupled between the fluid source and a primary input of the turbine, and a secondary input valve fluidly coupled between the fluid source and a secondary input of the turbine, the method further comprising at least one of:

based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

30. A computer-implemented method of controlling a turbocharger system, the computer-implemented method comprising:

identifying, with a computing system that comprises one or more hardware processors, one or more operating conditions of a turbocharger system that comprises a turbine, a fluid source comprising a pressurized fluid that is fluidly coupled to the turbine, at least one input valve fluidly coupled between the fluid source and an input of the turbine, at least one bypass valve fluidly coupled between the fluid source and an output of the turbine, and a rotating machine;

determining, with the computing system, a level of the pressurized fluid in the fluid source based on at least one of the one or more identified operating conditions;

determining, with the computing system, at least one of a flow rate or a pressure of a working fluid moved by the rotating machine based on at least another one of the one or more identified operating conditions; and based on at least one of the determined fluid source level and the at least one of the determined flow rate or pressure, operating, with the computing system, the at least one input valve and the at least one bypass valve to change an operating state of the turbine from a first operating state to a second operating state, wherein the first operating state comprises an initialization state and the second operating state comprises a stabilization state, and operating the at least one input valve and the at least one bypass valve to change an operating state of the turbine from the first operating state to the second operating state comprises:

determining, with the computing system, that the at least one input valve is in an automatic mode, determining, with the computing system, that an output recycle valve of the rotating machine is closed, and switching, with the computing system, the turbine from the initialization state to the stabilization state, and wherein the method further comprises operating, with the computing system, the at least one input valve and the at least one bypass valve to change the operating state of the turbine from the second operating state to a third operating state.

31. The computer-implemented method of claim 30, wherein the second operating state comprises the stabilization state and the third operating state comprises a damping state, and operating the at least one input valve and the at least one bypass valve to change the operating state of the turbine from the second operating state to the third operating state comprises:

determining, with the computing system, that an output flow valve of the rotating machine is open within a specified open percentage range;

determining, with the computing system, a flow of the working fluid is within a specified flow rate range;

determining, with the computing system, a level of the fluid source is at least greater than a threshold set point; and switching, with the computing system, the turbine from the stabilization state to the damping state.

32. The computer-implemented method of claim 31, further comprising, during the damping state:

determining, with the computing system, an overload on the turbine;

operating, with the computing system, the at least one input valve to adjust toward a closed position to reduce a flow rate of the pressurized fluid through the at least one input valve; and operating, with the computing system, the at least one bypass valve to adjust toward an open position to increase a flow rate of the pressurized fluid through the at least one bypass valve.

33. The computer-implemented method of claim 32, wherein determining the overload on the turbine comprises determining, with the computing system, that a discharge pressure of the working fluid from the rotating machine is above a threshold pressure.

34. The computer-implemented method of claim 33, further comprising, during the damping state:

determining, with the computing system, that the discharge pressure of the working fluid from the rotating machine is below the threshold pressure; and switching, with the computing system, the turbine from the damping state to the stabilization state.

35. The computer-implemented method of claim 32, further comprising, during the damping state:

determining, with the computing system, an underload on the turbine;

operating, with the computing system, the at least one input valve to adjust toward an open position to increase a flow rate of the pressurized fluid through the at least one input valve; and operating, with the computing system, the at least one bypass valve to adjust toward a closed position to decrease a flow rate of the pressurized fluid through the at least one bypass valve.

36. The computer-implemented method of claim 32, wherein the turbocharger system further comprises a safety shutdown valve that comprises an input fluidly coupled to an outlet of the fluid source, and an output fluidly coupled to the at least one input valve, the method further comprising, during the damping state:

determining, with the computing system, that the safety shutdown valve is in a closed position; and based on the determination that the safety shutdown valve is in the closed position, switching, with the computing system, the turbine from the damping state to a shutdown state.

37. The computer-implemented method of claim 31, further comprising, during the damping state:

determining, with the computing system, an underload on the turbine;

operating, with the computing system, the at least one input valve to adjust toward an open position to increase a flow rate of the pressurized fluid through the at least one input valve; and operating, with the computing system, the at least one bypass valve to adjust toward a closed position to decrease a flow rate of the pressurized fluid through the at least one bypass valve.

38. The computer-implemented method of claim 37, wherein determining the underload on the turbine comprises determining, with the computing system, that an output valve fluidly coupled to an output of the rotating machine is open more than a threshold open percentage.

39. The computer-implemented method of claim 38, further comprising, during the damping state:

determining, with the computing system, that the output valve fluidly coupled to the output of the rotating machine is open less than the threshold open percentage; and switching, with the computing system, the turbine from the damping state to the stabilization state.

40. The computer-implemented method of claim 31, wherein the turbocharger system further comprises a safety shutdown valve that comprises an input fluidly coupled to an outlet of the fluid source, and an output fluidly coupled to the at least one input valve, the method further comprising, during the damping state:

determining, with the computing system, that the safety shutdown valve is in a closed position; and based on the determination that the safety shutdown valve is in the closed position, switching, with the computing system, the turbine from the damping state to a shutdown state.

41. The computer-implemented method of claim 30, wherein the at least one input valve comprises a primary input valve fluidly coupled between the fluid source and a primary input of the turbine, and a secondary input valve fluidly coupled between the fluid source and a secondary input of the turbine, the method further comprising at least one of:

based on the determined fluid source level being at or less than a particular level threshold, operating the primary input valve to open to a fully open position and the secondary input valve to a fully closed position based on an output of the control system up to 66% output; or based on the determined fluid source level being greater than the particular level threshold, operating the primary input valve to open to the fully open position and the secondary input valve to a fully open position based on the output of the control system between 66%-100% output.

* * * * *